United States Patent Office 3,753,941
Patented Aug. 21, 1973

3,753,941
LATEX COMPOSITION
Fred N. Teumac, South Bend, Ind., and Charles D. Cline, Charlotte, N.C., assignors to Story Chemical Corporation, Athens, Ga.
No Drawing. Continuation-in-part of abandoned application Ser. No. 698,440, Jan. 17, 1968. This application July 28, 1971, Ser. No. 166,976
Int. Cl. C08d 7/02; C08f 37/00
U.S. Cl. 260—29.7 N                 7 Claims

ABSTRACT OF THE DISCLOSURE

A latex composition including an aqueous dispersion of carboxylated polymer containing a small proportion of a carboxylic acid, and a small proportion of an aziridinyl compound which reacts with carboxyl groups of the polymer upon curing to effect polymer cross-linking and thereby provide enhanced tensile strength, loading capacity, and insolubility characteristics in the cured product. It is a suitable treatment for textile, non-wovens, papers and other related products. The aziridinyl compound may be an aziridinyl azine such as triethylene melamine, proportioned at 1 part per 2 parts of carboxylic acid, such as fumaric acid, up to a triethylene melamine content of 1 part per 100 parts of polymer. The composition may advantageously contain a substantial quantity of filter material, such as clay or Whiting in an amount equivalent to 100 to 300 or more parts per 100 parts polymer for enhanced dimensional stability, stiffness and coating thickness.

CROSS-REFERENCES TO RELATED APPLICATIONS

This application is a continuation-in-part of pending application Ser. No. 698,440 filed Jan. 17, 1968, and now abandoned.

BACKGROUND OF THE INVENTION

Latex compositions of carboxylated polymers are presently used for coating and impregnating of textiles, papers and related products. Such latices are compounded by polymerization of one or more monomers, such as styrene, butadiene, vinyl acetate, vinyl chloride, or acrylic and methacrylic esters, and a monomer of an unsaturated, addition polymerizable carboxylic acid, such as acrylic, methacrylic, fumaric, maleic, itaconic, or crotonic acids. These latex compositions are prepared by conventional bulk, solution, suspension and emulsion polymerization to form polymer chains having pendant carboxyl groups that are available for a curing reaction with substances that in one way or another affect the mobility of the polymer chains in a manner analogous to sulfur vulcanization of rubber.

Heretofore, the reactants used for curing have been various metal ions, glycols and other polyhydroxyls, urea and melamine formaldehyde resins, phenolic resins, epoxy resins, and amines.

All of these known reactants, however, have disadvantages that adversely affect their utilization in obtaining acceptable cures of the carboxylated polymers for use as coatings and impregnants. Thus, metal ion reactants are susceptible to alkaline hydrolysis which renders the product unsuitable to withstand subsequent treatment such as the post-dyeing processing of back coated upholstery fabric; the glycols and other polyhydroxyls are also significantly subject to alkaline hydrolysis as well as being difficult to attain in that their ester formation does not readily occur in normal curing conditions for coating compositions; the various reactive resins (i.e., urea and melamine formaldehydes, phenolics and epoxies) preferentially polymerize with themselves or the substrate, requiring excessive amounts of the reactant to achieve a proper cure, which results in excessive stiffening of the cured product that is undesirable particularly in elastomer coatings; and the amines cure by forming amine salts of the carboxyl groups, which readily hydrolyze.

The foregoing disadvantages of the known prior reactants are avoided for all practical purposes according to the present invention by the use of a small proportion of an aziridinyl compound, such as an aziridinyl azine, as a reactant in a carboxylated vinyl polymer containing a small proportion of a carboxylic acid.

Aziridinyl compounds have not heretofore been used in this manner as a cure reactant, although they have been used as textile treating agents themselves rather than cure reactants, an example of which is disclosed in Wohnsiedler U.S. Pat. No. 2,784,166, issued Mar. 5, 1957. This known use of aziridinyl compounds as a direct treatment to a substrate does not, however, suggest the use of a cure reactant for enhancing the properties of the cure product itself with indirect improvement of the treated substrate, and the direct treatment with an aziridinyl compound does not produce the same type of treated product qualities as are intended and obtained by a latex curing treatment.

SUMMARY OF THE INVENTION

The latex composition of the present invention is an aqueous dispersion of a carboxylated polymer containing a small proportion of a carboxylic acid and a small proportion of an aziridinyl compound that reacts with carboxyl groups of the polymer upon curing to effect polymer cross-linking that results in enhanced tensile strength, loading capacity, insolubility, rapid curing, abrasion resistance, and compatibility with dye receptor characteristics to an extent not obtainable with prior art compositions.

This latex composition can be used effectively as a coating for upholstery, drapes, carpets, industrial cloth and other textiles, as a binder in non-wovens, such as battings, and as a coating, impregnant, or film for various other products.

The aziridinyl compound may be any known polyaziridinyl compound such as triethylene melamine or tris-(1-aziridinyl)-phosphine oxide. It may be either monomeric, which is preferred, or it may be polymeric.

The monomeric polyaziridinyl compounds are bis- or tris-aziridinyl compounds prepared from ethylene imines and substituted ethylene imines. They may be defined in terms of the following formula:

$$A{-}\!\!\left[{-}B_mCH_2CH_2N{\diagup\!\!\!\diagdown}\begin{matrix}CHR\\CH_2\end{matrix}\right]_n$$

where A is $COC_6H_4CO$, $COAlkCO$, $CONHArNHCO$, $CONHAlkNHCO$,

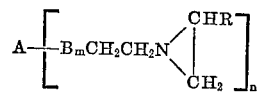

$COCH_2OCH_2CO$, $CH_2CH_2CO$, $CHCO$, $PO$, $PS$ or

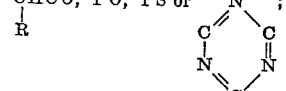

where B is NH or O; $m$ is zero or 1; R is lower alkyl, i.e., having 8 or fewer carbon atoms; $n$ is 2 or 3; and Alk is alkylene having up to 7 carbon atoms.

The polymeric polyaziridinyl compounds generally are prepared by reaction of an ethylene imine as above and a polymeric acid, ester or amide, e.g., polyacrylamide, and may be represented by the formula:

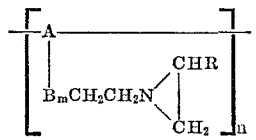

where A is

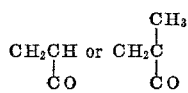

the CO being attached to B; B, $m$ and R are as above; and $n$ is from about 10 to about 10,000; and where

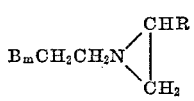

may be substituted for by H, OR or $NH_2$ up to $n$ minus two times.

As indicated, the monomeric polyaziridinyl compounds are preferred. Monomeric tris-aziridinyl compounds are especially preferred.

It is included in the composition in an amount sufficient to effect substantial polymer cross-linking, e.g., an amount equivalent to 1 part per 2 parts of carboxylic acid monomeric unit, such as fumaric acid, up to an aziridinyl compound content of 1 part per 100 parts of polymer, beyond which no significant increase in the desired properties is obtained to any practical extent and in fact produces undesirable stiffening of the cured composition. The carboxylic acid monomeric unit may be any olefinic monocarboxylic or dicarboxylic acid having up to 6 carbon atoms. These include, for example, fumaric, maleic, citraconic, itaconic, methacrylic, crotonic, or acrylic acid, preferably in an amount equivalent to 0.5 to 5 parts per 100 parts of vinyl copolymer to obtain proper curative cross-linking without reducing the treatability properties of the composition so that the composition can be applied to a substrate in a conventional manner to obtain the desired treated product qualities. Copolymers containing higher proportions of carboxylic acid monomeric units are relatively unsatisfactory for use in the invention herein because the treated fabrics are stiff and have poor tensile properties.

The above carboxylic acid monomeric units may be a part of vinyl copolymers of widely varying composition. One or more of such monomeric units may be present, in the above-indicated proportions, in vinyl copolymers of styrene, α-methyl styrene, p-tert-butyl styrene, butadiene, vinyl acetate, vinyl chloride, lower alkyl acrylates or lower alkyl methacrylates. The term "lower" designates an alkyl group having 8 or fewer carbon atoms. Generally, the carboxylated vinyl polymer is a terpolymer of 2 of the above non-carboxylic monomers and 1 of the above carboxylic monomer although simple copolymers of 1 non-carboxylic and 1 carboxylic monomer are also contemplated, as are more complex copolymers of 3 or more non-carboxylic and 1 or more carboxylic monomers. Any and all combinations of monomers within the above limits are contemplated.

Further, the latex composition of the present invention has a remarkable capacity for loading with a filler material, such as clay, Whiting and the like, which reduces the per pound cost and enhances dimensional stability, stiffness and coating thickness properties of the composition. A loading of up to 300 parts or more per 100 parts polymer is feasible without reducing beyond acceptable limits the other desirable properties of the composition.

DESCRIPTION OF THE PREFERRED EMBODIMENT

The latex composition of the present invention contains carboxyl groups obtained from the monomeric carboxylic acid component of the carboxylated vinyl polymer and aziridinyl groups obtained from a monomeric polyaziridinyl compound contained in the composition, which carboxyl groups and aziridinyl groups react upon curing to effect a polymer cross-linking that produces the aforementioned advantageous properties in the cured polymer. This curing reaction can be illustrated theoretically by the following equation:

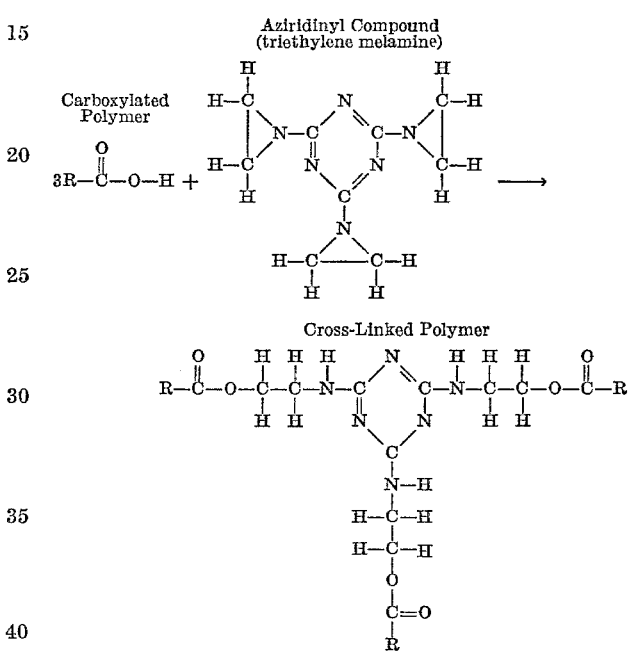

where R is the polymeric residue of the carboxylated vinyl polymer.

This cross-linking of the polymers reduces their mobility with a resulting increase in their strength. In addition, resistance to solubility is increased by the reduction of the number of free carboxyl groups resulting from this reaction.

The aziridinyl groups react readily with the carboxyl groups so that cross-linking occurs almost instantly as the composition is dried or is catalyzed by a drop in pH such as normally occurs on heating carboxylated polymers. Thus, curing results rapidly upon application of the composition to a substrate followed by normal heating, and the treated substrate is ready for further processing, such as dyeing, without requiring an intermediate curing period.

There is little tendency, as will be shown in the following examples, for the cured product to hydrolyze, and the selection of a proper aziridinyl compound, such as those specified herein, avoids discoloration that results with amine cures.

The following examples are illustrative of the present invention, but are not intended as limitations to the scope of the invention. All parts and percentages specified in these examples are by weight.

Example 1

A terpolymer of styrene (49%), butadiene (49%) and fumaric acid (2%) was prepared by conventional polymerization techniques to form a latex of 50% solids. To 200 grams of this latex was added 1 gram of triethylene melamine, and a film cast on glass to approximately .01" wet thickness. After drying at room temperature overnight the film was removed from the glass and placed in cold tap water (22° C.).

After standing for 30 minutes the film did not come apart, although it had "blushed" or turned cloudy. A film similarly treated without the triethylene melamine could not be removed from the water without tearing.

Example 2

A compound as follows:

|  | Dry parts |
|---|---|
| Latex (as in Example 1) | 100 |
| #10 Whiting (commercial grade of calcium carbonate) | 300 |
| Triethylene melamine | 1 |
| Thickener (sodium polyacrylate) | 0.5 | was prepared at 60% total solids by standard compounding techniques and coated on upholstery fabric at 5 ounces per square yard. The sample was then dried for 7 minutes at 250° F. to remove moisture.

Subsequently, the sample was washed in a commercial tumble washer at 212° F. for six hours (twice the equivalent of a conventional dyeing cycle) using 1% trisodium phosphate and 1% sodium dodecyl benzene sulfonate as the detergent system. On rinsing and drying the sample, there was no evidence of the film cracking or breaking and there was not a measurable amount of weight loss that would indicate wash-off.

A control, omitting only the triethylene melamine, lost 9.3% of coated weight in the same treatment and the back coating film was severly broken with little or no ability to perform its function.

The above-specified thickener was used to increase the viscosity of the composition for coating and to prevent undesirable settling out of the Whiting.

Example 3

Samples of the latex of Example 1 containing 0 and 1 part triethylene melamine per 100 parts polymer were prepared with 0 and 100 parts of #10 Whiting as filler. The samples were cast on glass to produce an average dry thickness of 0.025″ and dried at 72° F. 50% relative humidity for 16 hours. After drying, the films were cured for 5 minutes at 250° F.

From these films were cut ½″ wide test strips using a die cutter and the elongation and tensile properties determined. The results are shown in the table below:

| Parts triethylene melamine per 100 parts polymer | Parts filler per 100 parts polymer | Tensile strength at 300% elongation, gms./in. width |
|---|---|---|
| 0 | 0 | 98 |
| 1 | 0 | 572 |
| 0 | 100 | 240 |
| 1 | 100 | 522 |

As shown by the data above, some cure was achieved by the metal ions of the filler but was not as complete as with the triethylene melamine.

Example 4

Samples of styrene-butadiene-fumaric acid latex were prepared with the following monomer weight ratios.

(A) 49/49/2
(B) 49.5/49.5/1
(C) 49.67/49.67/0.66
(D) 47.75/49.75/0.5
(E) 50/50/0

The above latices were compounded as in Example 2 with 1.00, 0.50, 0.33, and 0.25 parts of triethylene melamine per 100 parts polymer. The compounds were coated onto scatter rug backing with an amount of compound equal to 18 ounces per square yard, then dried and cured for 10 minutes at 250° F. Again, as in Example 2, the coated fabric samples were tumble washed for 6 hours. On removing from the washer and drying, the samples were evaluated and judged as passing or failing to adequately withstand the washing. Failure was indicated as noticeable film breaking and visible signs of wash-off. The table below summarizes these tests.

| | Monomer ratio | | Parts triethylene melamine per 100 parts polymer | Evaluation |
|---|---|---|---|---|
| Styrene | Butadiene | Fumaric acid | | |
| 49 | 49 | 2 | 1.00 | Passed. |
| 49 | 49 | 2 | 0.50 | Failed. |
| 49 | 49 | 2 | 0.33 | Do. |
| 49 | 49 | 2 | 0.25 | Do. |
| 49.5 | 49.5 | 1 | 1.00 | Passed. |
| 49.5 | 49.5 | 1 | 0.50 | Do. |
| 49.5 | 49.5 | 1 | 0.33 | Failed. |
| 49.5 | 49.5 | 1 | 0.25 | Do. |
| 49.67 | 49.67 | 0.66 | 1.00 | Passed. |
| 49.67 | 49.67 | 0.66 | 0.50 | Do. |
| 49.67 | 49.67 | 0.66 | 0.33 | Do. |
| 49.67 | 49.67 | 0.66 | 0.25 | Failed. |
| 49.75 | 49.75 | 0.50 | 1.00 | Passed. |
| 49.75 | 49.75 | 0.50 | 0.50 | Do. |
| 49.75 | 49.75 | 0.50 | 0.33 | Do. |
| 49.75 | 49.75 | 0.50 | 0.25 | Do. |
| 50 | 50 | 0 | 1.00 | Failed. |
| 50 | 50 | 0 | 0.50 | Do. |
| 50 | 50 | 0 | 0.33 | Do. |
| 50 | 50 | 0 | 0.25 | Do. |

The foregoing test results show the importance of the relationship between the aziridinyl groups and the carboxyl groups in effecting an acceptable cure. Thus, as the amount of carboxyl group forming fumaric acid is decreased a corresponding lesser amount of the aziridinyl group forming triethylene melamine is required to obtain an acceptable cure.

Example 5

Compounds were prepared using 100 and 300 parts #10 Whiting per 100 parts polymer as in Example 1, and 0, 1.0, 2.0, 5.0, 10.0 and 20.0 parts triethylene melamine per 100 parts polymer. The compounds were coated onto upholstery fabric at 5 ounces per square yard and dried and cured at 250° F. for 7 minutes.

The samples were then tumble washed as in Example 2 for 6 hours, rinsed, dried and examined for signs of wash-off and back-coating failure. All the samples passed with the exception of the one wherein no triethylene melamine was used.

This example shows the acceptability of heavy loading of filler material and also indicates that additional amounts of the aziridinyl compound do not adversely affect the suitability of the product or enhance the desirable properties thereof.

Example 6

An emulsion terpolymer consisting of 48% styrene, 48% ethyl acrylate, and 4% methacrylic acid was prepared and compounded with 100 parts #10 Whiting per 100 parts polymer. To half the above compound was added 1 part triethylene melamine per 100 parts polymer and the materials thus prepared coated onto upholstery fabric with a coating weight of 5 ounces per square yard. The samples were then dried and cured at 250° F. for 7 minutes and washed as in Example 2.

Upon subsequent examination, the sample containing the triethylene melamine retained its film character and there were no signs of wash-off whereas the control had severely cracked and washed off.

Example 7

A series of latex samples were prepared using a 49/49/2 styrene/butadiene/fumaric acid terpolymer compounded with 1 part triethylene melamine per 100 parts polymer and 100 parts of clay (aluminum silicate), aluminum hydrate, and talc ($3MgO \cdot 4SiO_2 \cdot H_2O$). Controls were prepared with each of the three fillers omitting the triethylene melamine.

The wash test (as described in Example 2) showed all the samples with triethylene melamine passed and all without triethylene melamine failed.

Example 8

Samples of a 48/48/4 methyl methacrylate/styrene/acrylic acid terpolymer with and without 1 part of tris-(1 - aziridinyl)-phosphine oxide per 100 parts polymer were diluted to 10% total solids content and padded onto 80" x 80" cotton print cloth at 100% wet pickup. The fabric was then stretched on frames, dried for 5 minutes at 250° F. and cured 1½ minutes at 325° F.

The fabric thus treated was subjected to five home laundry cycles, drying and pressing with a dry smoothing iron between each cycle, and examined for "handle."

After the five cycles, nearly all the material without the tris-(1-aziridinyl)phosphine oxide had been washed out whereas the sample containing the triethylene melamine cross-linked polymer still retained a hand similar to the original material.

Example 9

Latex polymers were prepared with the following monomer compositions:

(A) 97% vinyl acetate/3% crotonic acid
(B) 23% vinyl acetate/73% ethyl acrylate/4% methacrylic acid
(C) 96% ethyl acrylate/4% methacrylic acid
(D) 78% vinyl acetate/18% butyl acrylate/4% acrylic acid To part of each of the above latices was added 1.0 part triethylene melamine per 100 parts polymer and the latices diluted to 10% total solids. These were then padded onto 80" x 80" cotton print cloth at 100% wet pickup, dried 5 minutes at 250° F. and cured 1½ minutes at 325° F. Samples were similarly prepared using the polymers without the addition of triethylene melamine.

The cloth was then subjected to five home laundry cycles, dried, pressed, and evaluated for hand as compared to the original cloth after each cycle.

All four polymers without the triethylene melamine were essentially completely removed after the second wash cycle whereas the material containing triethylene melamine witthstood the five launderings with practically no change in hand.

Example 10

A latex was prepared by emulsion polymerizing styrene (24%), butadiene (49%), acrylonitrile (24%), methacrylic acid (1%), and fumaric acid (2%). To 100 dry parts of this latex was added 100 parts #10 Whiting, 1.0 parts triethylene melamine, and sufficient water and sodium polyacrylate thickener to achieve 55% total solids and 5000 cps. viscosity.

The above material was coated onto upholstery fabric at 5.0 ounces per square yard. The coated sample was then heated in an oven for 7 minutes at 250° F.

Subsequent washing as in Example 2 produced no loss of coated weight and there was no evidence of cracking and peeling of the film.

Example 11

To a latex as in Example 1 was added triethylene melamine (1 part/100 parts rubber) and the sample diluted to 35% total solids with water. This material was then used to saturate 27 pounds per ream crepe paper to a dry pick-up of 100%, and the paper dried 3 minutes at 250° F. and cured 1 minute at 400° F.

One inch strips (machine direction) were cut from the saturated paper and bonded with a hot iron between two one-inch wide strips of heat sealable cloth tape. The resulting assembly was then soaked in water at 23° C. for two hours and then delaminated using a tensile tester with maximum range of 100 ounces with a 12" per minute rate of clamp separation.

A control was prepared as above omitting only the triethylene melamine.

The test results indicated that the sample with triethylene melamine had a resistance to wet delamination of 33.0 ounces per inch width whereas the control sample without triethylene melamine had a resistance to wet delamination of 19.8 ounces per inch width.

Example 12

Tris-(1-aziridinyl)phosphine oxide:

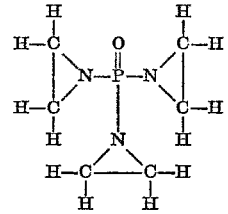

(1 part/100 parts polymer) was added to a latex compound consisting of:

| | Grams |
|---|---|
| (1) Latex (as in Example 1) | 200 |
| (2) #10 Whiting | 300 |
| (3) Tetra-sodium pyrophosphate dispersant salt (for dispersion of the Whiting) | 1 |
| (4) Sodium polyacrylate thickener (10% total solids) | 5 |

Water to adjust to 60% total solids was added and the resulting mixture coated onto scatter rug base stock at 18 ounces per square yard. The coatings were dried and cured at 250° F. for 7 minutes, then subjected to the wash test as described in Example 2.

The sample containing the phosphine oxide passed the test whereas the control sample without the phosphine oxide failed.

Similarly, other aziridinyl compounds listed below were tested and all passed when subjected to the wash test:

(A) Bis-aziridinyl ethyl ether:

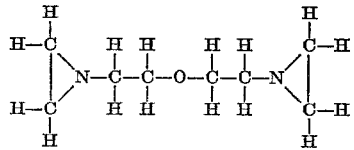

(B) N-(2-aziridinyl acetyl)ethylene imine:

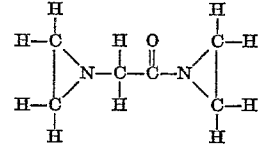

(C) 1,4-bis(ethyl aziridinyl)benzene:

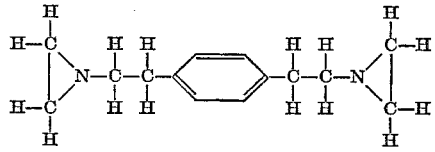

The specific aziridinyl compounds mentioned herein were those that have been available for testing, but it is evident that other aziridinyl compounds would also provide acceptable results. The polyaziridinyl compounds provide optimum results when used in a proportion equivalent to 1 part per 2 parts of carboxylic acid up to a content of 1 part of polyaziridinyl compound per 100 parts of polymer. More than 1 part of polyaziridinyl compound per 100 parts of polymer does not enhance the product and if excessive amounts are used it produces undesirable brittleness. Also, the ultimate elongation is seriously decreased, that is, the extent to which a film can be stretched before rupture is decreased; and there is a reduction in the force required to stretch a film to 300% of its normal length. Furthermore, in the case of a wetted (with water)

fiber, the physical properties in general are much less degraded if the relative proportion of polyaziridinyl compound used is within the above specified limits. Thus 1 part per 100 parts polymer is considered to be an optimum limit. A lesser amount, such as ¾ part per 100 parts polymer would also be a suitable optimum limit, but for practical purposes the slightly higher 1 part per 100 parts is considered advisable to assure optimum results.

Similarly, greater amounts of carboxylic acid are feasible for various purposes, though normally unnecessary, but excessive amounts could produce undesirable stiffness in the cured product.

The proportions of the compounds set out herein, and particularly the low carboxylic acid and aziridinyl compound proportions, provide a latex composition that can be easily applied to substrates without undesirable curing prior to treatment and with desirable rapid curing after application so that a lengthy curing process is not necessary and the treated substrate can be otherwise treated within a short period after the latex treatment.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A latex composition which when applied to a substrate such as textiles and the like provides a relatively permanent coating which is effective to improve the tensile strength thereof consisting essentially of an aqueous dispersion of a vinyl copolymer of one or more non-carboxylic monomers and one or more olefinic carboxylic monomers having up to 6 carbon atoms, said copolymer containing from 0.5 to about 5 parts of carboxylic acid monomeric units per 100 parts of copolymer and from 1 part of a monomeric tris-aziridinyl compound per 2 parts of said carboxylic acid monomeric units, said monomeric tris-aziridinyl compound being reactive with the carboxyl groups of said copolymer to cause said copolymer to become cross-linked.

2. The latex composition of claim 1 wherein the monomeric tris-aziridinyl compound is tris-aziridinyl phosphine oxide.

3. The latex composition of claim 1 wherein the vinyl copolymer is a copolymer of (1) 1 or more of styrene, butadiene, vinyl acetate, vinyl chloride, a lower alkyl acrylate or a lower alkyl methacrylate and (2) 1 or more of a monomeric olefinic carboxylic acid having up to 6 carbon atoms.

4. The latex composition of claim 3 wherein the vinyl copolymer is a terpolymer.

5. The latex composition of claim 4 wherein the terpolymer is a terpolymer of styrene, butadiene and fumaric acid.

6. The latex composition of claim 4 wherein the terpolymer is a terpolymer of styrene, butadiene and acrylic acid.

7. The latex composition of claim 3 wherein the monomeric tris-aziridinyl compound is tris-aziridinyl phosphine oxide.

References Cited
UNITED STATES PATENTS

| | | | |
|---|---|---|---|
| 3,017,280 | 1/1962 | Yudelson | 260—86.1 X |
| 3,093,602 | 6/1963 | Booth et al. | 260—29.6 X |
| 3,261,796 | 7/1966 | Simms | 260—29.6 HN |

MORRIS LIEBMAN, Primary Examiner

T. DeBENEDICTIS, Sr., Assistant Examiner

U.S. Cl. X.R.

260—29.6 HN, TA, EMP, 29.7 H, T, P, 86.1; 117—155 U